Aug. 6, 1940.   P. F. PETERSEN   2,210,002
LAWN MOWER
Filed May 26, 1939

Inventor
Peter F. Petersen

By Clarence A. O'Brien
and Hyman Berman
Attorneys

Patented Aug. 6, 1940

2,210,002

UNITED STATES PATENT OFFICE 2,210,002

LAWN MOWER

Peter F. Petersen, Tulsa, Okla., assignor by decree of court to John W. Petersen, Davenport, Iowa Application May 26, 1939, Serial No. 275,994

2 Claims. (Cl. 56—294)

The present invention relates to new and useful improvements in lawn mowers and has for its primary object to provide, in a manner as hereinafter set forth, novel means for weighting the rotating blade cylinder in a manner to lend added force to the blades thereon, thereby materially increasing the efficiency of the machine particularly under difficult conditions, such as when the grass is long, wet, dry, etc.

Other objects of the invention are to provide an improved rotating blade cylinder for lawn mowers of the character described which will be comparatively simple in construction, strong, durable, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
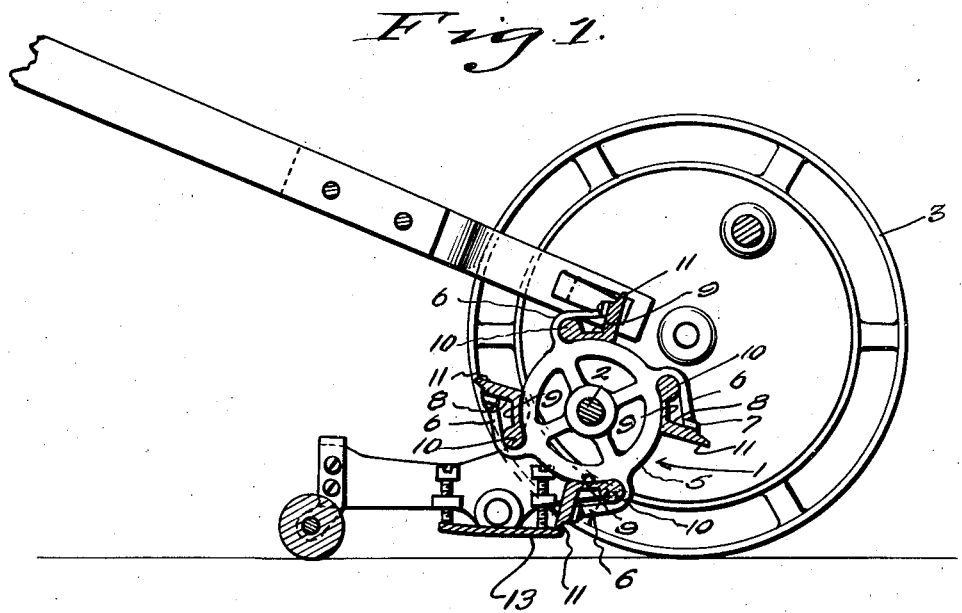
Figure 1 is a view in vertical longitudinal section through a lawn mower provided with a rotating blade cylinder constructed in accordance with the present invention.
Figure 2:
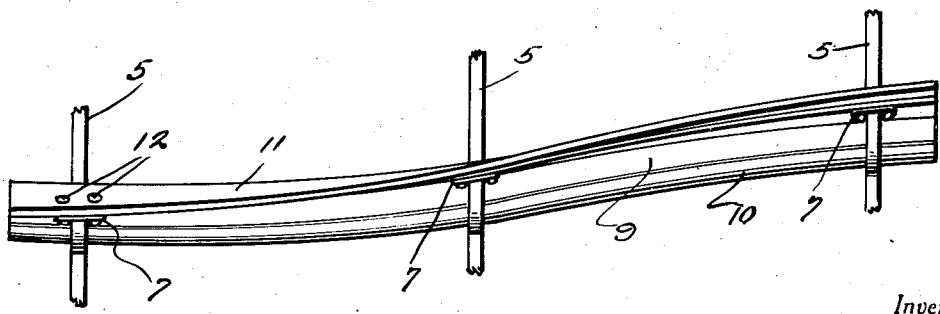
Figure 2 is a top plan view of a portion of the rotating blade cylinder.

Referring now to the drawing in detail, it will be seen that the embodiment of the invention which has been illustrated comprises a rotating blade cylinder which is designated generally by the reference numeral 1. The cylinder 1 is mounted on a shaft 2 which is actuated in the usual manner by the driving wheels 3 of the mower.

The cylinder 1 comprises a plurality of apertured discs 5 of suitable metal which are fixed at spaced points on the shaft 2. Formed integrally with the peripheries of the discs 5 are angular fingers 6 which are provided, on their free ends, with T-heads 7.

The reference numeral 11 designates blades which are mounted on the T-heads 7 of the fingers 6, said blades being provided with shoulders 8. Projecting angularly from the shoulders 8 are flanges 9 having beads on their free edges constituting weight bars 10 which extend the length of the rotating blade cylinder 1. Rivets 12 secure the blades 11 to the T-heads 7 of the fingers 6.

It is thought that the manner in which the invention functions will be readily apparent from a consideration of the foregoing. With the cylinder rotating at a given speed the weights 10 will lend considerable force of power to the blades 11 in an obvious manner. Of course, the rotating blades 11 cooperate with the usual stationary blade 13 of the mower for cutting the grass, weeds, etc.

It is further understood, and made a part hereof, that the adding of extra weight, of whatsoever form or nature, to increase the swinging force of a rotating blade cylinder of a lawn mower, is made the essence of this novel invention, within the meaning hereof.

It is believed that the many advantages of a lawn mower constructed in accordance with the present invention will be readily understood and although a preferred embodiment of said invention is as illustrated and described, it is to be understood that changes in the details of construction and in the combination and arrangement of parts may be resorted to which will fall within the scope of the invention as claimed.

What is claimed is:

1. A lawn mower comprising a rotary blade carrying cylinder, forwardly extending fingers having portions connected with parts of the circumference of the cylinder with the forwardly extending parts of the fingers spaced from the cylinder, blade members, each of substantially angle shape in cross section, one arm of the angle being located in the space between a finger and the adjacent part of the cylinder and the other arm of the angle projecting from the cylinder, means for connecting the last-mentioned arm with the free end of the finger and the edge of said last-mentioned arm forming a cutting edge and a weight forming enlargement on the edge of the other arm.

2. A lawn mower comprising a rotary blade carrying cylinder, fingers connected with the circumference of the cylinder and spaced apart and each finger including a short radial portion connected with the cylinder and a longer forwardly extending part connected with the outer end of the radial part, blade members each of substantially angle shape in cross section, one arm of the angle being located in the space between a finger and the adjacent part of the cylinder and the other arm of the angle projecting from the cylinder and having its edge beveled to form a cutting edge and means for connecting the last-mentioned arm with the free end of the finger.

PETER F. PETERSEN.